(12) United States Patent
Osaka

(10) Patent No.: US 6,771,794 B1
(45) Date of Patent: Aug. 3, 2004

(54) ELECTRONIC WATERMARK GENERATING APPARATUS, ELECTRONIC WATERMARK GENERATING METHOD AND MEMORY MEDIUM THEREFOR

(75) Inventor: Hitoshi Osaka, Okayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/494,302

(22) Filed: Jan. 31, 2000

(30) Foreign Application Priority Data

Feb. 2, 1999 (JP) .......................................... 11-025111

(51) Int. Cl.$^7$ ................................................ G06K 9/00
(52) U.S. Cl. ....................... 382/100; 380/235; 380/216; 713/176
(58) Field of Search ................................. 382/100, 210; 345/764, 744; 370/389; 358/1.9, 3.28; 380/235; 713/176

(56) References Cited

U.S. PATENT DOCUMENTS 6,252,971 B1 * 6/2001 Wang ........................ 382/100
6,411,725 B1 * 6/2002 Rhoads ....................... 382/100
6,529,506 B1 * 3/2003 Yamamoto et al. ......... 370/389
2002/0033844 A1 * 3/2002 Levy et al. ................. 345/744

* cited by examiner

Primary Examiner—Timothy M. Johnson
Assistant Examiner—Barry Choobin
(74) Attorney, Agent, or Firm—Fitzpatrick, Cella, Harper & Scinto

(57) ABSTRACT

In a situation where a data portion is considered as of higher importance in the course of preparation of original data, the designer is enabled to set the electronic watermark in a position that is judged appropriate by the designer. There are provided input means for setting and entering information to be added as the electronic watermark, area data preparation means for setting and preparing the area data of the electronic watermark, first display/reproduction means for displaying or reproducing the digital data in which the electronic watermark is to be applied, electronic watermark addition means for adding the electronic watermark to the digital data, and second display/reproduction means for displaying or reproducing the digital data to which the electronic watermark is added, thereby setting the electronic watermark in a specified area in the digital data and satisfactorily preventing the infringement of the copyright by tampering of the work.

7 Claims, 5 Drawing Sheets

ELECTRONIC WATERMARKED IMAGE DATA

ELECTRONIC WATERMARKING IMAGE AREA

ELECTRONIC WATERMARK GENERATING APPARATUS, ELECTRONIC WATERMARK GENERATING METHOD AND MEMORY MEDIUM THEREFOR

BACKGROUND OF THE INVENTION

1. Field of the Invention

The present invention relates to an electronic watermark generating apparatus, an electronic watermark generating method and a memory medium storing an electronic watermark generating program, and more particularly to an electronic watermark or a digital watermark applicable to multimedia data consisting of image data, moving image data, audio data or a combination thereof or to an output print of such data and adapted to transmit a concealed signal for indicating the copyright of the author, detecting the violation of the copyright by tampering of the copyright work, and verifying the authenticity of such copyright work or the print thereof.

2. Related Background Art

In conventional application of the electronic watermark to the digital data, the electronic watermark information is secondarily attached to the digital data in the form of general image, moving image or audio data. Therefore, when the author of the data is preparing the original digital data, it is not possible to arbitrarily designate the position of such addition or the information to be attached as the watermark.

Also the conventional electronic watermark consists of attaching invariable information in fixed manner to the already completed digital data, and there has not been conceived a process of dynamic addition, to the data information varying from time to time at the utilization of data, of the electronic watermark information matching the situation of such data information.

It is therefore not possible to set the electronic watermark in a position considered appropriate by the designing person, in the conventional method of setting the electronic watermark in a specified area of the digital data, and in a situation where a portion of the data is judged to be of higher importance.

It is also not possible, in the utilization of the digital data after the preparation thereof, to arbitrarily generate the appropriate electronic watermark in automatic manner and to attach such electronic watermark to the digital data.

SUMMARY OF THE INVENTION

In consideration of the foregoing, a first object of the present invention is, in a situation where, in the course of preparation of original digital data, there exists a portion considered of higher importance, to enable the designing person to set the electronic watermark in an arbitrary position considered appropriate by the designing person.

A second object of the present invention is to enable generation from time to time of the appropriate electronic watermark and attachment thereof to the digital data, according to the situation of the use thereof.

A third object of the present invention is to enable display and reproduction of a field portion to be complemented afterwards by the additional data, and to enable generation and addition of the electronic watermark to the digital data even in a situation where such digital data are used after the preparation thereof.

The electronic watermark generating apparatus of the present invention comprises setting the information to be added as the electronic watermark and the area data of such electronic watermark, also displaying or reproducing the digital data to which the electronic watermark is to be added, adding the electronic watermark to thus displayed or reproduced digital data and displaying or reproducing the digital data in which the electronic watermark is added.

The electronic watermark generating apparatus of the present invention, being adapted to generate electronic watermark, comprises input means for setting and entering information to be added as the electronic watermark, area data preparation means for setting and preparing the area data of the electronic watermark, first display/reproduction means for displaying or reproducing the digital data in which the electronic watermark is to be applied, electronic watermark addition means for adding the electronic watermark to the digital data, and second display/reproduction means for displaying or reproducing the digital data to which the electronic watermark is added.

The electronic watermark generation apparatus of the present invention is further featured by a fact that the second display/reproduction means for displaying or reproducing the digital data is adapted to also display or reproduce the field portion to be complemented afterwards by the additional data.

The electronic watermark generation apparatus of the present invention is further featured by a fact that the above-mentioned field portion to be complemented by the additional data is adapted to generate the electronic watermark information based on the content of the above-mentioned additional data.

The electronic watermark generating method of the present invention comprises setting the information to be added as the electronic watermark and the area data of such electronic watermark, also displaying or reproducing the digital data to which the electronic watermark is to be added, adding the electronic watermark to thus displayed or reproduced digital data and displaying or reproducing the digital data in which the electronic watermark is added.

The electronic watermark generating method of the present invention, being adapted to generate electronic watermark, comprises an input step of setting and entering information to be added as the electronic watermark, a step of setting and preparing the area data of the electronic watermark, a step of displaying or reproducing the digital data in which the electronic watermark is to be applied, a step of adding the electronic watermark to the digital data, and a step of displaying or reproducing the digital data to which the electronic watermark is added.

The electronic watermark generation method of the present invention is further featured by a fact that the second display/reproduction step of displaying or reproducing the digital data is adapted to also display or reproduce the field portion to be complemented afterwards by the additional data.

The electronic watermark generation method of the present invention is further featured by a fact that the above-mentioned field portion to be complemented by the additional data is adapted to generate the electronic watermark information based on the content of the above-mentioned additional data.

The memory medium of the present invention comprises storing, in a computer readable manner, a program for causing a computer to function as means constituting the above-mentioned electronic watermark generating apparatus.

The memory medium of the present invention comprises storing, in a computer readable manner, a program for causing a computer to execute the steps of the above-mentioned electronic watermark generating method.

Still other objects of the present invention, and the features thereof, will become fully apparent from the following description which is to be taken in conjunction with the attached drawings.

DETAILED DESCRIPTION OF THE PREFERRED EMBODIMENTS

In the following there will be explained, with reference to the attached drawings, embodiments of the electronic watermark generating apparatus, electronic watermark generating method and memory medium storing the electronic watermark generating program of the present invention.

Figure 1:
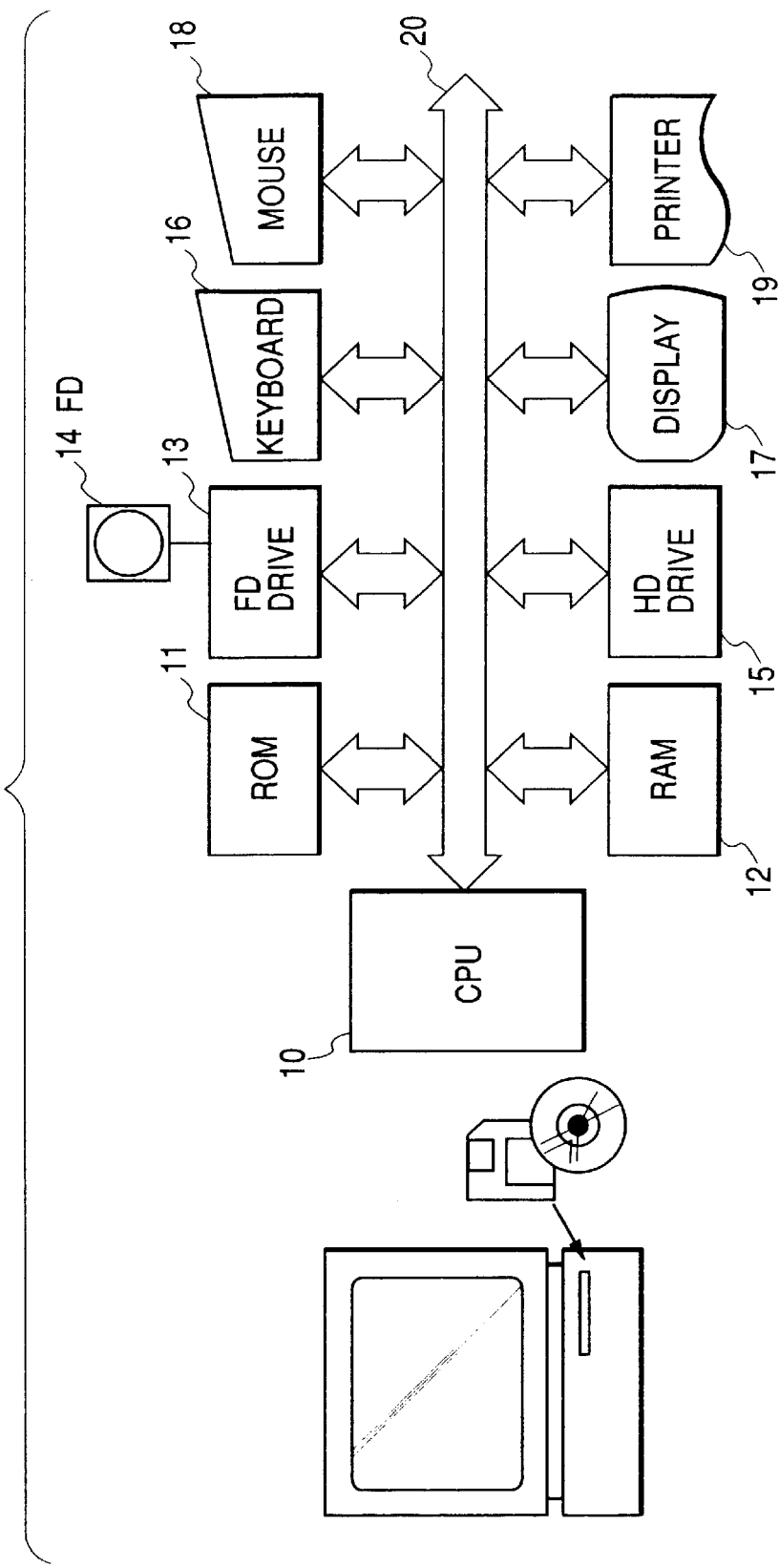
FIG. 1 is a block diagram showing the schematic configuration of hardware in an embodiment of the present invention.

FIG. 1 is a block diagram showing the hardware configuration of an information processing system in which applied is the pattern editing method embodiment the present invention. The system is principally composed of a central processing unit (CPU) 10, a main memory consisting of a ROM 11 and a RAM 12, an external memory consisting for example of a FD drive 13 and a HD drive 15, an input device consisting of a keyboard 16 and a pointing device such as a mouse 18, a display device such as a CRT display 17, a printing device such as a printer 19 or a plotter, and a system bus 20 connecting these components.

The information processing system of the present embodiment functions by the execution of a basic I/O program, an OS and a graphic editing program by CPU 10. The basic I/O program is stored in the ROM 11 while the OS is stored in the HD 15. When the power supply to the control device is turned on, the OS is read from the HD 15 into the RAM 12 by the IPF (initial program loading) function of the basis I/O program, whereby the execution of the OS is initiated.

Figure 2:
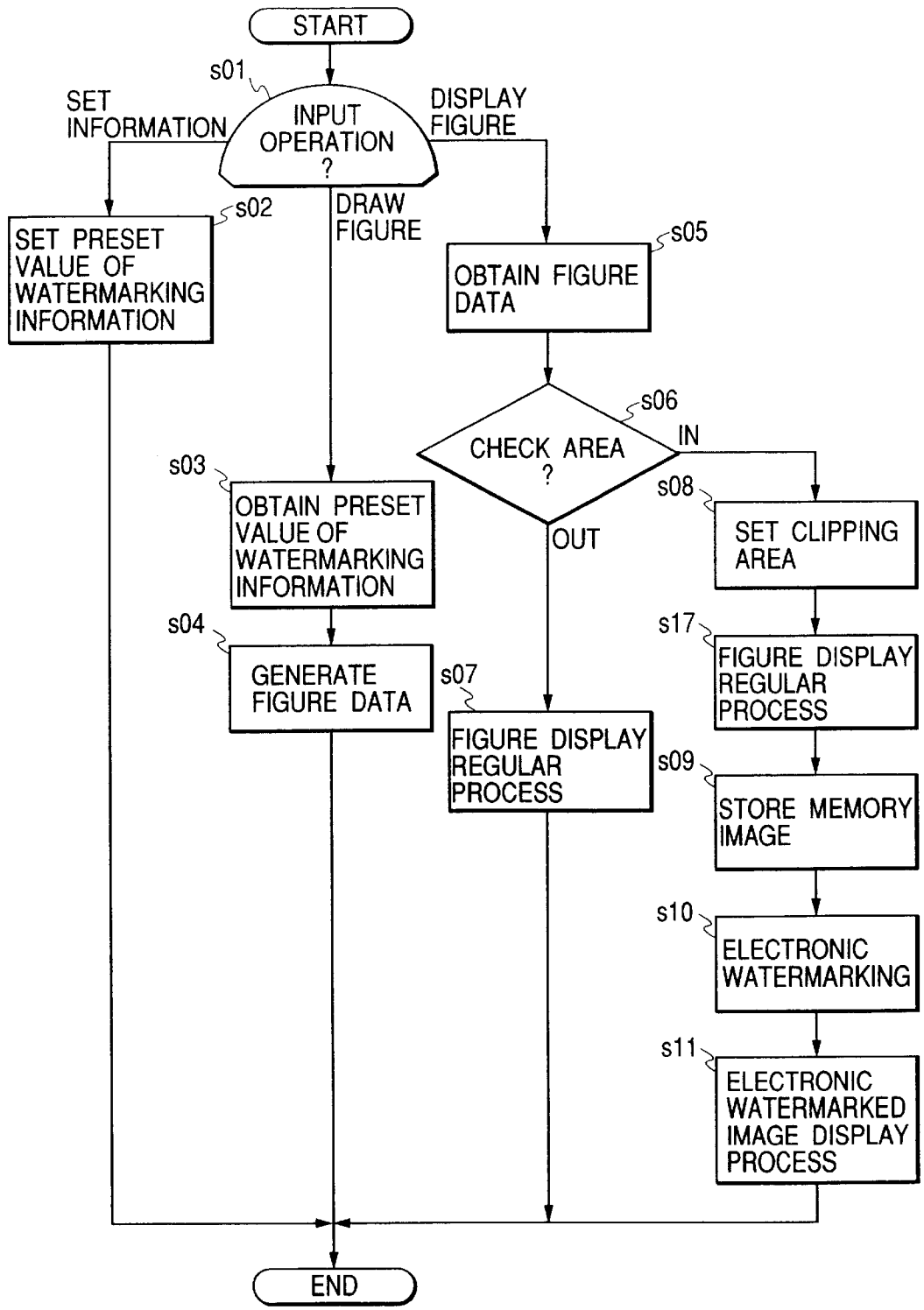
FIG. 2 is a flow chart showing the function of the electronic watermark generating apparatus of a first embodiment.

The electronic watermark generating program is formed into the program codes according to the flow chart of the control sequence shown in FIG. 2. In the present embodiment, the electronic watermark generating control program and the related data are stored in the FD 14, and an example of the stored content is shown in FIG. 3.

Figure 3:
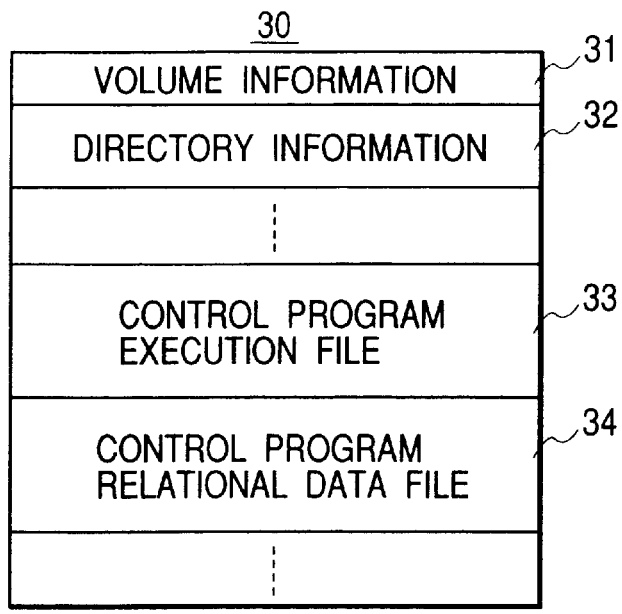
FIG. 3 is a view showing an example of the content stored in the memory medium.

As shown in FIG. 3, the memory area of the medium 30 (FD 14) is divided in a medium volume information area 31, a medium directory information area 32, a control program execution field area 33, a control program data file area 34 etc.

The electronic watermark generation control program and the related data stored in the FD 14 can be loaded into the processing system through the FD drive 13 as shown in FIG. 1. When the FD 14 is set in the FD drive 13, the electronic watermark generation control program and the related data are read from the FD 14 under the control of the OS and the basic I/O program and loaded into the RAM 12 thereby being rendered executable.

Figure 4:
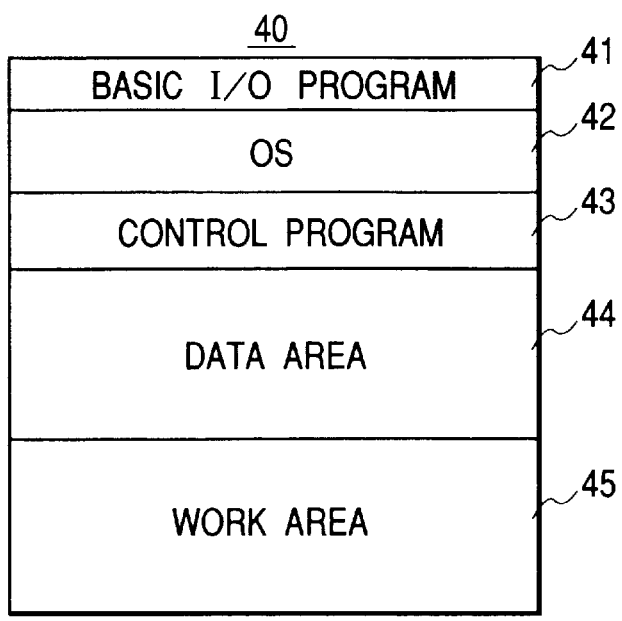
FIG. 4 is a view showing an example of the configuration of the memory areas in the executable state in an embodiment.

FIG. 4 shows the memory map in a state where the electronic watermark generation control program of the present embodiment is loaded in the RAM 12 and rendered executable, and the memory area of the medium 40 is divided into a basic I/O program 41, an OS 42, a control program 43, a data area 44, a work area 45 etc.

In the present embodiment, the electronic watermark generation control program and the related data are loaded from the FD 14 directly into the RAM 12 for execution, but it is also possible to install the program and the related data from the FD 14 in the HD 15 and to load them from the HD 15 to the RAM 12 at the execution of the program.

Also the memory medium for storing the electronic watermark generation control program need not be an FD but can also be, for example, a CD-ROM or an IC memory card. It is furthermore possible to record the program in the ROM 11 so as to constitute a part of the memory map and to directly execute the program by the CPU 10.

In the following there will be given a detailed description on the electronic watermark generating method of the present embodiment, referring to the attached drawings and taking the preparation of the image data as an example. The designing person preparing the image data (hereinafter simply called designer) prepares an image according to the operation sequence of the already known image preparing software. In addition to the preparation of the image data, the designer generates an electronic watermark pattern, in an arbitrary position on the image, according to a sequence similar to that for the ordinary graphic preparation. The electronic watermark pattern is supposed to contain the information to be added as the electronic watermark to the base image data.

At first, in response to an input operation of the designer, there is discriminated whether it designates setting of the electronic watermark information for the electronic watermark pattern, or preparation of the electronic watermark pattern, or display of the image data (step s01).

Figure 5:
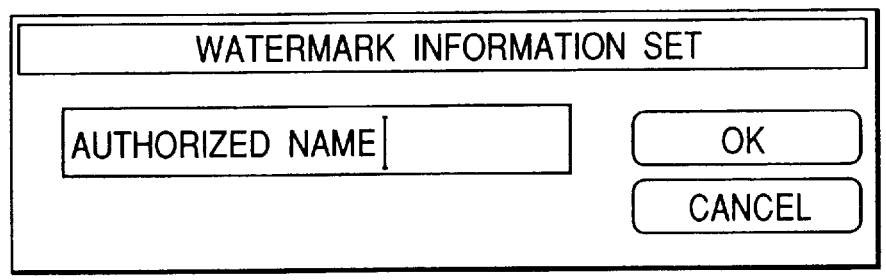
FIG. 5 is a view showing an example of the electronic watermark setting image frame in an embodiment.

If the discrimination of the step s01 indicates that the input operation designates the setting of the electronic watermark information for the electronic watermark pattern, there is entered information such as a character train to be added to the image data, to which the electronic watermark is to be added, in an area displayed on a display device as shown in FIG. 5, and such entered information is stored, as the set value of the electronic watermark information for the electronic watermark pattern to be prepared later, in a work area 45 in the memory (step s02).

On the other hand, if the discrimination of the step s01 indicates that the input operation designates the preparation of the electronic watermark pattern, the sequence proceeds to a step s03 for obtaining the electronic watermark information, stored in the work area 45 of the memory, to be set in the electronic watermark pattern. Then the electronic watermark pattern is prepared in a data area 44 in the memory, according a method similar to the known sequence for preparing a rectangular pattern (step s04).

Also if the discrimination of the step s01 indicates that the input operation designates the display of the image data, there is at first discriminated whether the electronic watermark pattern is contained in an area to be re-displayed. For this discrimination, the position of the electronic watermark pattern is obtained from the data area 44 of the memory (step s05).

Then the area of re-display and the area of the electronic watermark pattern are compared to discriminate whether the electronic watermark pattern is contained in the area of re-display (step s06). If the discrimination identifies that the electronic watermark pattern is not contained in the re-display area, the sequence proceeds to a step s07 for executing the ordinary image display process.

Figure 6A:
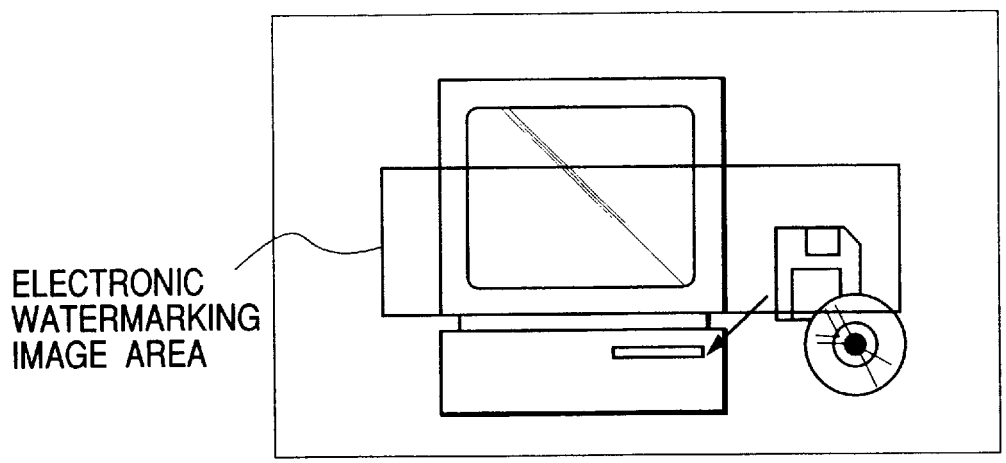
FIGS. 6A and 6B are views showing an example of the image data in an embodiment.
Figure 6B:
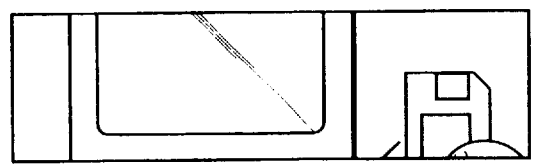

On the other hand, the discrimination of the step s06 identifies that the electronic watermark pattern is contained in the re-display area, at first the drawn image is clipped in the area of the electronic watermark pattern (step s08), and then the ordinary image display process is executed (step s17), and the image data contained in the clipping range are once stored as a memory image (FIGS. 6A and 6B) in the work area 45 of the memory (step s09).

Then there is executed a process of adding the attribute of the watermark stored in the foregoing step s02 (electronic watermark incorporating process) to thus obtained memory image. Then the memory image (FIGS. 6A and 6B) stored in the work area 45 is obtained, and the electronic watermark information of the electronic watermark pattern, obtained from the data area 44 of the memory, is added to the above-mentioned memory image. This addition is executed by the known electronic watermark adding method to newly generate an image with watermark (FIG. 7), which is stored in the work area 45 in the memory (step s10).

Figure 7:
FIG. 7 is a view showing an example of the image in the added state of the electronic watermark pattern in an embodiment.

In the image with watermark shown in FIG. 7, the electronic watermark is shown in visible state for the purpose of understanding, but in practice the electronic watermark is preferably in invisible state because of the property thereof.

Figure 8:
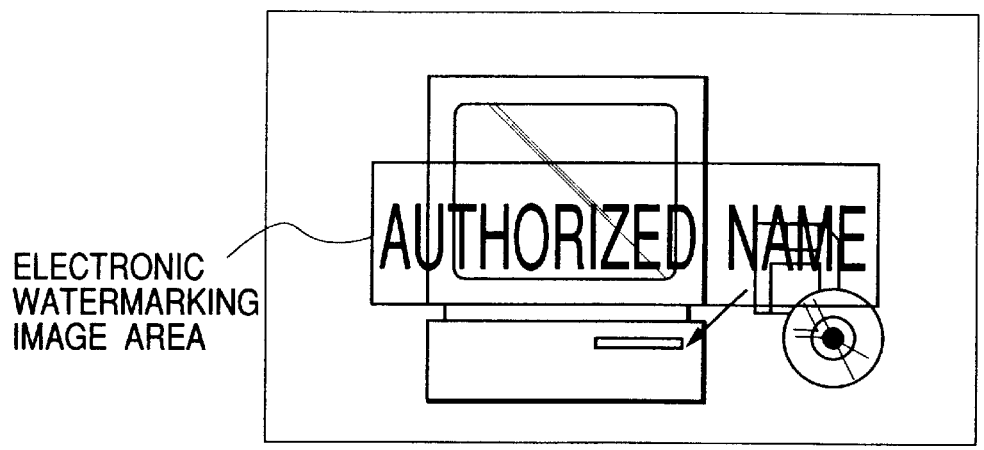
FIG. 8 is a view showing an example of the image in the displayed state of the electronic watermark pattern in an embodiment.

Then thus obtained image (FIG. 7) is obtained again from the work area 45 of the memory, and the position of the electronic watermark pattern is arbitrarily designated and the image is transferred to the memory area corresponding to the display device, in order to display it on the display image frame as shown in FIG. 8 (step s11).

The electronic watermark pattern need not be of a rectangular area as shown in the foregoing embodiment, but can be of other shapes such as a polygon, an oval, a curved shape or a specified shape. In this manner various shapes can be used for defining the electronic watermark area, thereby enabling the generation of electronic watermark in more efficient manner in freer manner.

Also the above-mentioned display process can be easily adapted to a process of storing the prepared data as an image file, by changing the destination of transfer of the data transfer process to a memory area.

It is also applicable to a case of copying the image by a reproducing process in a memory area (generally called clipboard) that can be utilized in common among the applications. It is furthermore applicable to a print output process to a printing device.

Furthermore, the above-described process is similar effective not only to the image but also to the multimedia data consisting of moving image, audio data of a combination thereof. Also in such multimedia data, it is common to apply a process to the data by a manipulation on the image rendered visible for example along the time axis, and the electronic watermark area can be set on the multimedia data by a process matching respective processing system, as in the application of the electronic watermark pattern to the image.

In addition, in reproducing the data, in the area containing the electronic watermark, the routine of reproducing the data with the added electronic watermark information can be executed in the same manner as in the case of image.

[Second Embodiment]

In contrast to the electronic watermark generating method of the foregoing first embodiment, the second embodiment contemplates a case including a data portion that is not determined at the preparation of the original data.

In the following there will be explained a business form image as an example. As already known, a part of the business form is left blank in the business form process, and such blank part is complemented by obtaining a number, a character train or an image for example from a database at the preview display or at the printing output.

Such blank area is called "field", and a pattern element for constituting the field is hereinafter called "field pattern". Also the data for complementing the field is hereinafter called "afterward additional data". Consequently, at the preparation of the data, the designer is in a situation incapable of obtaining the final image in which the field item cannot be complemented by the additional data.

In preview display or printing of the data containing such field pattern, the watermark adding process is executed in a manner similar to that in the first embodiment, and such process is different from that of the first embodiment in the step s07.

At first, in the ordinary image display process, if the field pattern is contained, the field pattern is displayed in a form complemented with the additional data. Thereafter the process of adding the electronic watermark data is similarly executed to achieve addition (incorporation) of the watermark to the image data including the afterward additional data.

The above-described process is similarly effective, not only to the image data but also to the multimedia data consisting of moving image data, audio data or a combination thereof. More specifically, there can be considered a situation where certain additional information is determined at the actual use also in case of the moving image data or the audio data.

For example, there can be considered a situation where plural information providers extract identical original information source from a shared multimedia database and add, as the electronic watermark information, information indicating the source of provision (for example name of information provider or information destination) to such source data for supply to the customers.

[Effect Specific to the Embodiment]

By executing the electronic watermark process at the display of the field pattern complemented with the additional data, the electronic watermark information can be added at the display for the actual use or at the printing, also in a portion that is not determined at the preparation of the original data.

[Third Embodiment]

In contrast to the electronic watermark generating method of the foregoing second embodiment, the field pattern itself may contain means for automatically generating the content of information to be added as the watermark, based on the content of the additional data.

For example, in case the field pattern for printing a character train is displayed or printed with a character train given thereto, such character train itself may be processed as the electronic watermark information as in the second embodiment, whereby the content of the character train constitutes the actually visible image data and also added as the watermark, whereby there can be automatically obtained the image data that is reinforced against the tampering of the data content.

Figure 9:
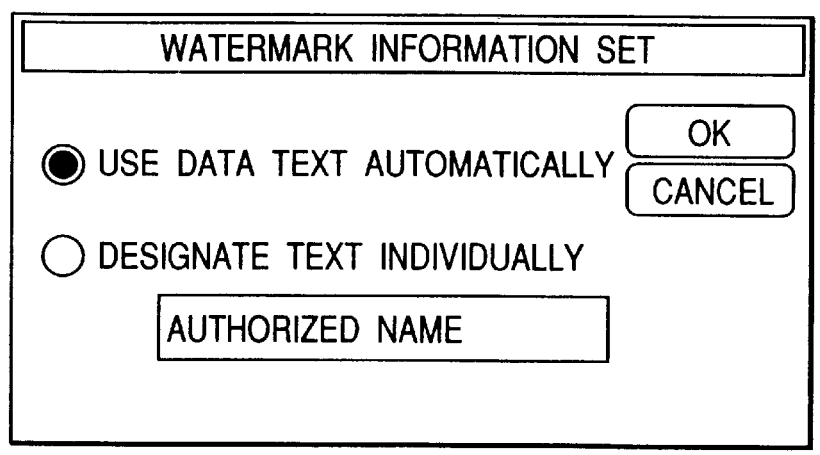
FIG. 9 is a view showing an example of the setting image frame for the electronic watermark pattern of a third embodiment.

In the present embodiment, the watermark attribute can be set, from an area of the display device as shown in FIG. 9, in the field pattern of the second embodiment. In this example, character train data are added afterwards to the field, and there are provided two setting methods of adding the content of such character train to the electronic watermark information or automatically setting the character train to be added in fixed manner.

The content set in this operation is stored, as in the first embodiment, in the work area 45 of the memory as the set value of the electronic watermark information of the field pattern, and is used as the attribute of the field pattern to be prepared.

In the following there will be explained the display operation of the field pattern in which such watermark attribute is actually set. When the image re-display is requested, there is discriminated whether the area to be re-displayed contains the field pattern.

For this purpose there is obtained the position of the field pattern from the data area 44 in the memory of the main memory. Then the re-display area and the area of the electronic watermark pattern are compared to discriminate whether the field pattern is contained in the re-display area.

If the field pattern is discriminated to be contained in the re-display area, there is at first executed the ordinary image display process, and, after the drawing of all the image data including the field pattern complemented by the afterwards additional data, the drawn image is clipped in the field pattern area, and a portion of the image contained in such area alone is generated as an image in another memory area. This image is stored in the work area 45 on the memory of the main memory.

Then thus generated image data are subjected to the addition of the electronic watermark as in the first embodiment, utilizing the watermark attribute of the field pattern obtained from the data area 44 of the memory.

The foregoing process is similarly effective not only the image data but also to the multimedia data consisting of moving image data, audio data or a combination thereof. In case of the moving image data or audio data, as the original data themselves are of a large data mount, it is not practical to use the content thereof as the electronic watermark information, though such use is still possible.

However, a similar effect can be expected by obtaining, together with the actual data, a value or character information representing such data, and to use such value or character information appropriately in the electronic watermark information. For example, a producer superposes an element of a music or an image with the original data, the title, owner or acquirer of the data used as such element may be inserted as the electronic watermark into the digital data obtained by such superposing. In such case, there can be verified that such element is properly used without illegal tampering.

[Effect Specific to the Embodiment]

The addition of the information, given to the field pattern in relation to the afterwards additional data, to the electronic watermark information allow to more effectively prevent tampering of the data portion to be given as the afterwards additional data.

[Other Embodiments]

The present invention may be applied to a system consisting of plural equipment (for example host computer, interface devices, reader, printer etc.) or an apparatus consisting of a single equipment.

Also the present invention includes a case where the program codes of a software realizing the functions of the aforementioned embodiments are supplied to a computer of a system or an apparatus connected to various devices in order to operate the devices so as to realize the functions of the aforementioned embodiments and the functions of the aforementioned embodiments are realized by operating the devices by the computer (CPU or MPU) of the above-mentioned system or apparatus according to the program codes.

In such case the program codes themselves of the software realize the functions of the aforementioned embodiments, and the program codes themselves and the means for supplying the computer with such program codes, for example a memory medium storing the program codes, constitutes the present invention. The memory medium storing such program codes can be, for example, a floppy disk, a hard disk, an optical disk, a magnetooptical disk, a CD-ROM, a magnetic tape, a non-volatile memory card or a ROM.

The present invention also includes such program codes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

According to the present invention, as explained in the foregoing, in a situation where a data portion is considered as of higher importance in the course of preparation of original data, the designer is enabled to set the electronic watermark in a position that is judged appropriate by the designer, whereby the right of the copyright owner can be made clear and the infringement of the right by tampering of the work can be satisfactorily prevented.

According to another feature of the present invention, there is also displayed or reproduced the field portion that is to be complemented by the additional data, so that the electronic watermark can be generated and added to the digital data when the digital data are actually used after the preparation thereof.

Also according to another feature of the present invention, the appropriate electronic watermark can be generated from time to time and added to the digital data according to the situation of use thereof.

In the foregoing embodiments, there is specified an area of embedding the electronic watermark information, but it is also possible to specify an area where the watermark information cannot be embedded, for example an area where high image quality is requested.

What is claimed is:

1. An apparatus for generating an electronic watermark comprising:
   means for inputting digital data having a field portion to be complemented by afterward additional data;
   means for inputting the afterward additional data;
   means for setting information to be added as the electronic watermark;
   means for setting an area of the digital data, to which the electronic watermark is to be applied; and
   means for complementing the field portion of the digital data by the afterward additional data and adding the set information to the set area as the electronic watermark,
   wherein said means for adding adds to the digital data information including the afterward additional data.

2. A method for generating an electronic watermark, comprising the steps of:
   inputting digital data having a field portion to be complemented by afterward additional data;
   inputting the afterward additional data;
   setting information to be added as the electronic watermark;
   setting an area of the digital data, to which the electronic watermark is to be applied; and
   complementing the field portion of the digital data by the afterward additional data and adding the set information to the set area as the electronic watermark,
   wherein said adding step adds to the digital data information including the afterward additional data.

3. A memory medium storing, in computer readable manner, a program for causing a computer to execute the steps of the electronic watermark generation method according to claim 2.

4. An electronic watermark generation apparatus according to claim 1 further comprising means for reproducing the digital data to which the electronic watermark is added.

5. An electronic watermark generation method according to claim 2 further comprising a step of reproducing the digital data to which the electronic watermark is added.

6. An apparatus for generating an electronic watermark comprising:
   means for inputting digital data having a field portion to be complemented by afterward additional data;
   means for inputting the afterward additional data;
   means for generating electronic watermark information based on the content of the afterward additional data; and
   means for complementing the field portion of the digital data by the afterward additional data and adding the electronic watermark information.

7. A method of generating an electronic watermark, comprising:
   a digital data input step of inputting digital data having a field portion to be complemented by afterward additional data;
   an afterward additional data input step of inputting the afterward additional data;
   an electronic watermark information generation step of generating electronic watermark information based on the content of the afterward additional data input in said afterward additional data input step; and
   a control step of complementing the field portion of the digital data by the afterward additional data input in said afterward additional data input step and adding the electronic watermark information generated in said electronic watermark information generation step.

* * * * *

UNITED STATES PATENT AND TRADEMARK OFFICE
CERTIFICATE OF CORRECTION

PATENT NO. : 6,771,794 B1
DATED : August 3, 2004
INVENTOR(S) : Hitoshi Osaka

It is certified that error appears in the above-identified patent and that said Letters Patent is hereby corrected as shown below:

Column 3,
Line 44, "the present" should read -- of the present --.

Column 5,
Line 66, "similar" should read -- similarly --.

Column 6,
Line 1, "of a" should read -- or a --.

Column 7,
Line 47, "only the" should read -- only to the --.
Line 51, "mount" should read -- amount --.

Column 10,
Line 2, "claim 1" should read -- claim 1, --.
Line 4, "claim 2" should read -- claim 2, --.

Signed and Sealed this

Twenty-sixth Day of April, 2005

JON W. DUDAS
*Director of the United States Patent and Trademark Office*